United States Patent
Jang et al.

(10) Patent No.: US 12,548,822 B2
(45) Date of Patent: Feb. 10, 2026

(54) BATTERY PACK AND DEVICE INCLUDING THE SAME

(71) Applicant: LG Energy Solution, LTD., Seoul (KR)

(72) Inventors: Sunghwan Jang, Daejeon (KR); Junyeob Seong, Daejeon (KR); Myungki Park, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 779 days.

(21) Appl. No.: 17/796,222

(22) PCT Filed: Apr. 5, 2021

(86) PCT No.: PCT/KR2021/004177
§ 371 (c)(1),
(2) Date: Jul. 28, 2022

(87) PCT Pub. No.: WO2021/206383
PCT Pub. Date: Oct. 14, 2021

(65) Prior Publication Data
US 2023/0187728 A1 Jun. 15, 2023

(30) Foreign Application Priority Data
Apr. 9, 2020 (KR) .................. 10-2020-0043617

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/653* (2015.04);
(Continued)

(58) Field of Classification Search
CPC .......... H01M 10/6556; H01M 10/613; H01M 10/653; H01M 10/6568; H01M 50/211;
(Continued)

(56) References Cited

U.S. PATENT DOCUMENTS

2012/0313559 A1 12/2012 Tonomura et al.
2013/0164578 A1 6/2013 Sweet et al.
(Continued)

FOREIGN PATENT DOCUMENTS

CN 108695458 A 10/2018
CN 110854320 A 2/2020
(Continued)

*Primary Examiner* — Muhammad S Siddiquee
(74) *Attorney, Agent, or Firm* — Bryan Cave Leighton Paisner LLP

(57) ABSTRACT

A battery pack including: a battery cell stack including a plurality of battery cells; a housing for the battery cell stack; a pair of end plates that cover the front and rear surfaces of the battery cell stack and are coupled to the housing; and a heat sink positioned below a bottom portion of the housing. The bottom portion of the housing forms an upper plate of the heat sink, and mounting and fixing structures of the pair of end plates, the housing, and the heat sink are formed in a collective fastening method.

13 Claims, 8 Drawing Sheets

(51) Int. Cl.
*H01M 10/653* (2014.01)
*H01M 10/6568* (2014.01)
*H01M 50/211* (2021.01)
*H01M 50/262* (2021.01)

(52) U.S. Cl.
CPC ..... *H01M 10/6568* (2015.04); *H01M 50/211* (2021.01); *H01M 50/262* (2021.01)

(58) Field of Classification Search
CPC ............ H01M 50/262; H01M 50/204; H01M 10/658; H01M 10/623; H01M 10/625; H01M 2220/20; H01M 2220/30; H01M 10/6551; Y02E 60/10; Y02T 10/70
See application file for complete search history.

(56) References Cited

U.S. PATENT DOCUMENTS

| | | | |
|---|---|---|---|
| 2014/0023906 A1* | 1/2014 | Hashimoto | H01M 10/625 429/157 |
| 2016/0268656 A1 | 9/2016 | Park | |
| 2017/0194676 A1 | 7/2017 | Omura | |
| 2018/0366794 A1 | 12/2018 | Kim et al. | |
| 2019/0074562 A1 | 3/2019 | Kim et al. | |
| 2019/0131596 A1 | 5/2019 | Yang et al. | |
| 2019/0173064 A1 | 6/2019 | Lee et al. | |
| 2019/0372065 A1 | 12/2019 | Kawata et al. | |
| 2020/0006824 A1 | 1/2020 | Lim | |
| 2020/0067155 A1 | 2/2020 | Hwang et al. | |
| 2020/0101813 A1* | 4/2020 | Tominaga | B60L 1/003 |
| 2020/0185672 A1 | 6/2020 | Seo | |

FOREIGN PATENT DOCUMENTS

| | | |
|---|---|---|
| CN | 110915019 A | 3/2020 |
| JP | 2012-256521 A | 12/2012 |
| JP | 2017-142942 A | 8/2017 |
| JP | 2018-527705 A | 9/2018 |
| JP | 2019-212395 A | 12/2019 |
| KR | 2012-256521 A | 12/2012 |
| KR | 10-2016-0109155 A | 9/2016 |
| KR | 10-2017-0053429 A | 5/2017 |
| KR | 20170050509 A | 5/2017 |
| KR | 10-2017-0067240 A | 6/2017 |
| KR | 10-2018-0038310 A | 4/2018 |
| KR | 10-2018-0047383 A | 5/2018 |
| KR | 10-2019-0026237 A | 3/2019 |
| KR | 10-2020-0001781 A | 1/2020 |
| KR | 10-2020-0008624 A | 1/2020 |
| KR | 10-2020-0021608 A | 3/2020 |
| WO | 2014024432 A1 | 2/2014 |
| WO | 2014034107 A1 | 3/2014 |

* cited by examiner

BATTERY PACK AND DEVICE INCLUDING THE SAME

CROSS-REFERENCE TO RELATED APPLICATIONS

This application is a US national phase of international Application No. PCT/KR2021/004177 filed on Apr. 5, 2021, and claims priority to and the benefit of Korean Patent Application No. 10-2020-0043617 filed in the Korean Intellectual Property Office on Apr. 9, 2020, the entire contents of which are incorporated herein by reference.

TECHNICAL FIELD

The present invention relates to a battery pack and a device including the same, and more specifically, to a battery pack having improved cooling performance and a device including the same.

BACKGROUND

In modern society, in accordance with the daily use of portable devices such as a mobile phone, a laptop computer, a camcorder, a digital camera, and the like, technologies in a field related to the above-mentioned mobile devices have been actively developed. In addition, rechargeable secondary batteries are used as a power source for an electric vehicle (EV), a hybrid electric vehicle (HEV), a plug-in hybrid electric vehicle (P-HEV), and the like, in an attempt to solve air pollution and the like caused by existing gasoline vehicles using fossil fuel. Therefore, there is an increasing need for the development of secondary batteries.

Currently commercialized secondary batteries include a nickel cadmium battery, a nickel hydrogen battery, a nickel zinc battery, a lithium secondary battery, and the like. Among these, the lithium secondary battery has come into the spotlight because it has advantages, for example, lithium second batteries hardly exhibit memory effects compared to nickel-based secondary batteries, thereby being freely charged and discharged, and having a very low self-discharge rate and high energy density.

Such a lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate coated with the positive electrode active material and the negative electrode active material, respectively, are disposed with a separator interposed therebetween, and a battery case that seals and accommodates the electrode assembly together with an electrolyte.

Generally, the lithium secondary battery may be classified into a can type of secondary battery in which the electrode assembly is embedded in a metal can, and a pouch type of secondary battery in which the electrode assembly is embedded in a pouch of an aluminum laminate sheet, depending on a shape of the exterior material.

A secondary battery used for a small-sized device can include two to three battery cells, but a secondary battery used for a medium to large-sized device such as an automobile can include a battery module in which a plurality of battery cells are electrically connected. In such a battery module, the plurality of secondary batteries are connected to each other in series and in parallel, thereby enhancing capacity and output. In addition, one or more battery modules may be mounted together with various control and protection systems, such as a battery management system (BMS) and a cooling system, to form a battery pack.

When the secondary battery is heated over a proper temperature, performance of the secondary battery may deteriorate, and in severe cases, the secondary battery may explode or catch fire. Particularly, in the battery module or battery pack provided with a plurality of secondary batteries, that is, battery cells, the heat emitted from the plurality of battery cells in a narrow accumulates, which may increase the temperature of the battery module rapidly and severely. In other words, in a case of a battery module in which a plurality of battery cells are stacked and a battery pack in which the battery module is mounted, a high output may be obtained, but it is not easy to remove heat generated in the battery cells during charging and discharging. When heat dissipation of the battery cell is not properly performed, deterioration of the battery cell is accelerated and lifespan thereof is shortened, and a possibility of explosion or ignition increases.

Further, when the battery module is included in a battery pack for a vehicle, the battery module may be frequently exposed to direct sunlight, and may also be placed in a high-temperature condition, for example in summer or in a desert.

Therefore, when a battery module or a battery pack is configured, it is very important to ensure stable and effective cooling performance.

FIG. 1 illustrates a perspective view of a conventional battery module, and FIG. 2 illustrates a cross-sectional view along line A-A' of FIG. 1. Particularly, FIG. 2 further illustrates a heat transmitting member and a heat sink positioned under the battery module of FIG. 1.

As illustrated in FIG. 1 and FIG. 2, in a conventional battery module 10, a plurality of battery cells 11 are stacked to form a battery cell stack 20, and the battery cell stack 20 is accommodated in a housing 30.

As described above, since the battery module 10 includes the plurality of battery cells 11, a large amount of heat is generated during charging and discharging processes. As a cooling means, the battery module 10 may include a thermally conductive resin layer 40 positioned between the battery cell stack 20 and a bottom portion 31 of the housing 30. In addition, when the battery module 10 is mounted in a frame to form a battery pack, a heat transmitting member 50 and a heat sink 60 may be sequentially positioned under the battery module 10. The heat transmitting member 50 may be a heat dissipation pad, and the heat sink 60 may have a refrigerant flowing path formed therein.

Heat generated from the plurality of battery cells 11 sequentially passes through the thermally conductive resin layer 40, the bottom portion 31 of the housing 30, the heat transmitting member 50, and the heat sink 60 to be transmitted to the outside of the battery module 10.

However, in the case of the conventional battery module 10, the heat transmitting path is complicated as described above, and it is difficult to effectively transmit the heat generated from the plurality of battery cells 11. The housing 30 itself may reduce the heat conduction characteristics, and fine air layers such as air gaps that may be respectively formed between the housing 30, the heat transmitting member 50, and the heat sink 60 may also be a factor that deteriorates the heat conductive characteristic.

Since there is a consistent demand for a battery module having a small design and enhanced capacity, it is substantially required to develop a battery module that may enhance cooling performance while satisfying various requirements as above.

SUMMARY

Embodiments of the present invention are proposed to solve the above-mentioned problems of the methods proposed in the prior arts. Therefore, it is an objective of the present invention to provide a battery pack with improved cooling performance and a device including the same.

However, the objective of the present invention is not limited to the aforementioned one, and may be extended in various ways within the spirit and scope of the present invention.

An embodiment of the present invention provides a battery pack including: a battery cell stack in which a plurality of battery cells are stacked; a housing accommodating the battery cell stack; a pair of end plates that cover front and rear surfaces of the battery cell stack and is coupled to the housing; and a heat sink positioned below a bottom portion of the housing, wherein the bottom portion of the housing forms an upper plate of the heat sink, and mounting and fixing structures of the end plate, the housing, and the heat sink are formed in a collective fastening method.

The battery pack may further include a frame positioned under the heat sink and coupled to the housing, wherein the mounting and fixing structure may be coupled to the frame.

The pair of end plates may include a first mounting portion extending in a protruding direction of an electrode lead protruding from the battery cell, the housing may include a second mounting portion extending along the first mounting portion from the bottom portion, the heat sink may include a third mounting portion extending along the first mounting portion, first to third through-holes may be respectively formed in the first to third mounting portions, and the first to third through-holes may be positioned to correspond to each other.

The battery pack may further include a mounting bolt that penetrates the first to third through-holes to be coupled to a fastening hole of the frame.

The mounting bolt may include a head portion at an upper end thereof, and the head portion may have a larger diameter than the first through-hole.

A supply pipe of the heat sink and the bottom portion may form a refrigerant flowing path.

The bottom portion may be in direct contact with the refrigerant.

The supply pipe may be a U-shaped pipe, and the bottom portion may be positioned at an open upper side of the U-shaped pipe.

The supply pipe may include an inlet for introducing the refrigerant and an outlet for discharging the refrigerant.

The battery pack may further include a frame positioned under the heat sink to be coupled to the housing, and a refrigerant supply pipe positioned between the frame and the heat sink to supply the refrigerant to the supply pipe.

An opening formed in the refrigerant supply pipe may be connected to the inlet.

At least one of the inlet and the outlet may include a sealing member surrounding an outer circumference thereof, and the sealing member surrounding the inlet may be positioned between the supply pipe and the refrigerant supply pipe.

The battery pack may further include a thermal resin layer positioned between the bottom portion of the housing and the battery cell stack.

According to the exemplary embodiments of the present invention, it is possible to provide a battery module with improved cooling performance through an integrated structure of a housing and a heat sink.

In addition, a pair of end plates, a housing, and a heat sink may be fixed together by fastening, thereby simplifying a manufacturing process and increasing ease of assembly between respective parts.

Further, it is possible to reduce costs by removing an unnecessary cooling structure and a fastening structure, and it is possible to increase spatial utility, thereby increasing capacity or output of a battery module.

DETAILED DESCRIPTION

Figure 1:
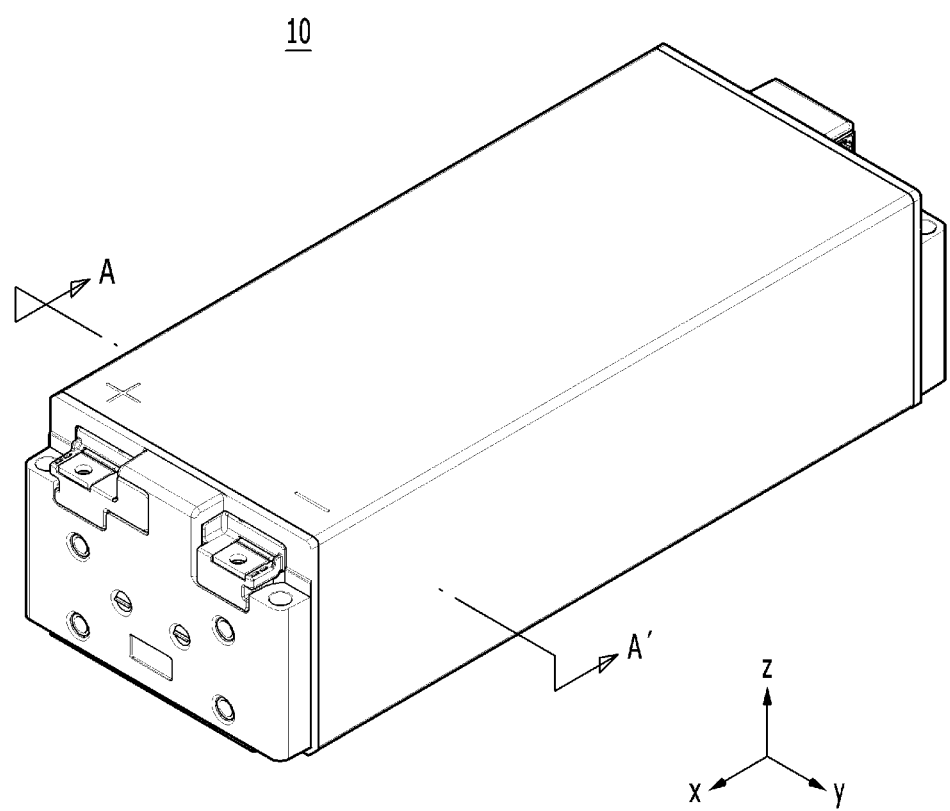
FIG. 1 is a perspective view of a conventional battery module.

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

In order to clearly describe the present invention, parts or portions that are irrelevant to the description are omitted, and identical or similar constituent elements are denoted by the same reference numerals throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Figure 3:
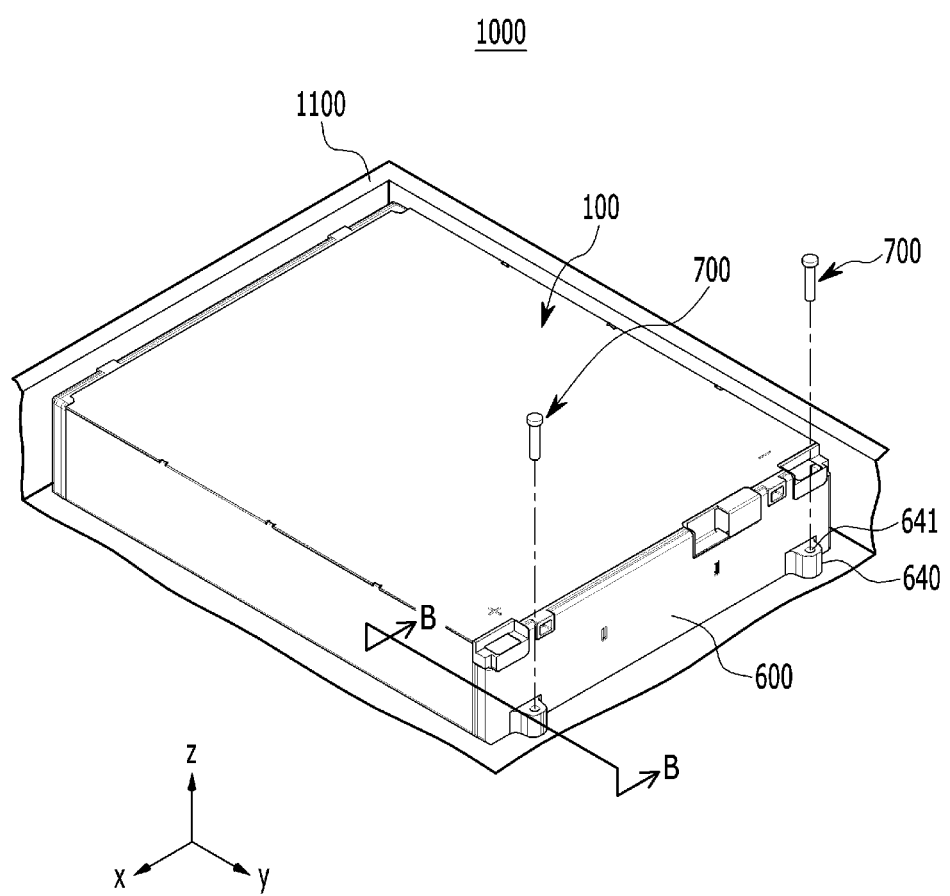
FIG. 3 is a partial perspective view of a battery pack according to an exemplary embodiment of the present invention.
Figure 4:
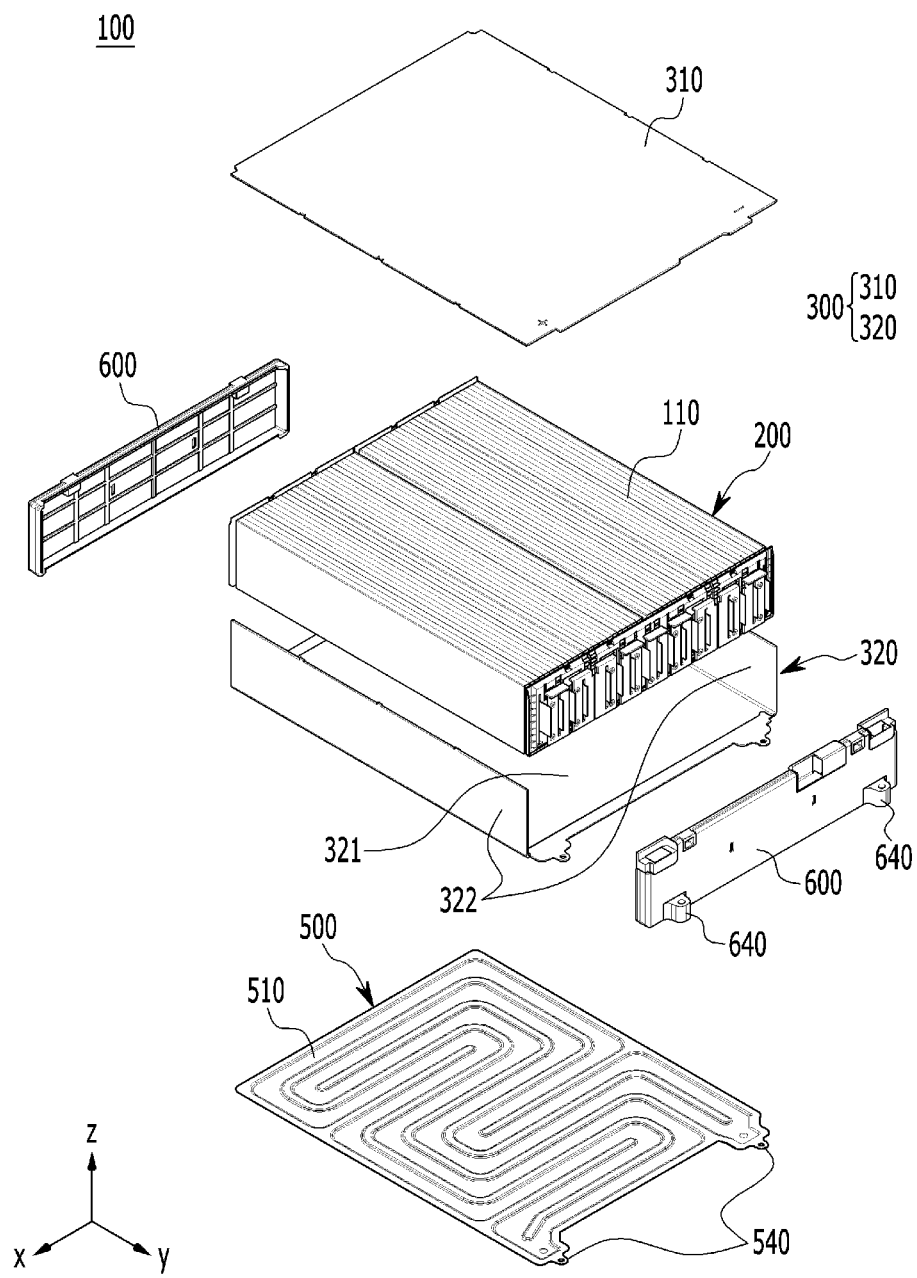
FIG. 4 is an exploded perspective view of a battery module included in the battery pack of FIG. 3.

FIG. 3 is a partial perspective view of a battery pack according to an exemplary embodiment of the present invention, and FIG. 4 is an exploded perspective view of a battery module included in the battery pack of FIG. 3.

As illustrated in FIG. 3 and FIG. 4, a battery pack 1000 according to an exemplary embodiment of the present invention includes a battery module 100, and the battery module 100 includes: a battery cell stack 200 in which a plurality of battery cells 110 are stacked; a housing 300 for accommodating the battery cell stack 200; a pair of end plates 600 that cover a front surface (a y-axis direction) and a back surface (an opposite direction of a y-axis) of the battery cell stack 200 and is coupled to the housing 300; and a heat sink 500 positioned below a bottom portion 321 of the housing 300.

The bottom portion 321 of the housing 300 forms an upper plate of the heat sink 500, and mounting and fixing structures of the end plate 600, the housing 300, and the heat sink 500 are formed in a collective fastening method. The collective fastening method will be described in detail below with reference to FIG. 5 and FIG. 6.

The battery pack 1000 according to the present embodiment may further include a frame 1100 coupled to the housing 300, and the frame 1100 may be positioned under the heat sink 500. The housing 300 may be coupled to the frame 1100 by a fixing member included in the mounting and fixing structure.

First, the battery cell 110 is preferably a pouch type of battery cell. It may be manufactured by accommodating the electrode assembly in a pouch case of a laminate sheet including a resin layer and a metal layer, and then thermally fusing a sealing portion of the pouch case. The battery cell 110 may be formed to have a rectangular sheet-like structure.

A plurality of the battery cells 110 may be configured, and the plurality of battery cells 110 are stacked to be electrically connected to each other to form the battery cell stack 200. Particularly, as shown in FIG. 4, the plurality of battery cells 110 may be stacked along a direction parallel to an x-axis.

The housing 300 accommodating the battery cell stack 200 may include an upper cover 310 and a U-shaped frame 320.

The U-shaped frame 320 may include a bottom portion 321 and two side portions 322 extending in an upward direction from both ends of the bottom portion 321. The bottom portion 321 may cover a lower surface (an opposite direction of a z-axis) of the battery cell stack 200, and the side portions 322 may cover both side surfaces (an x-axis direction and an opposite direction thereof) of the battery cell stack 200.

The upper cover 310 may be formed to have a single plate-shaped structure that surrounds the remaining upper surface (z-axis direction) excluding the lower surface and the both side surfaces surrounded by the U-shaped frame 320. The upper cover 310 and the U-shaped frame 320 may form a structure that covers the battery cell stack 200 up, down, left, and right by being coupled by welding or the like in a state in which corner portions corresponding to each other contact each other. The battery cell stack 200 may be physically protected through the upper cover 310 and the U-shaped frame 320. To this end, the upper cover 310 and the U-shaped frame 320 may include a metal material having a predetermined strength.

Meanwhile, although not specifically illustrated, a housing 300 according to a modified example may be a mono frame in a form of a metal plate in which an upper surface, a lower surface, and both side surfaces are integrated. That is, the U-shaped frame 320 and the upper cover 310 are not mutually coupled, but may be manufactured by extrusion molding to have a structure in which an upper surface, a lower surface, and both side surfaces are integrated.

The pair of end plates 600 may be positioned to cover the front surface (y-axis direction) and the rear surface (y-axis opposite direction) of the battery cell stack 200. The pair of end plates 600 may physically protect the battery cell stack 200 and other electrical components from external impact, and the pair of end plates 600 may be provided with a battery module mounting structure to fix the battery module to the frame.

Meanwhile, although not specifically illustrated, a bus bar frame on which a bus bar is mounted and an insulating cover for electrical insulation may be positioned between the battery cell stack 200 and the pair of end plates 600.

Hereinafter, the collective fastening method will be described in detail.

Figure 5:
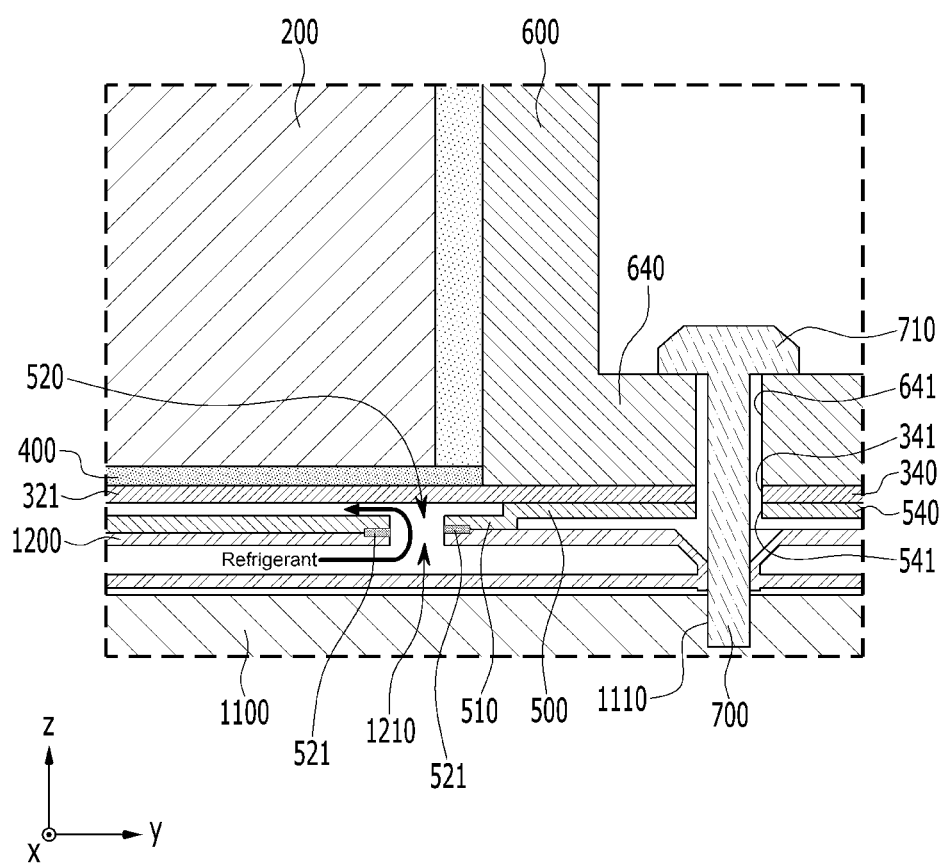
FIG. 5 is a cross-sectional view along line B of FIG. 3.
Figure 6:
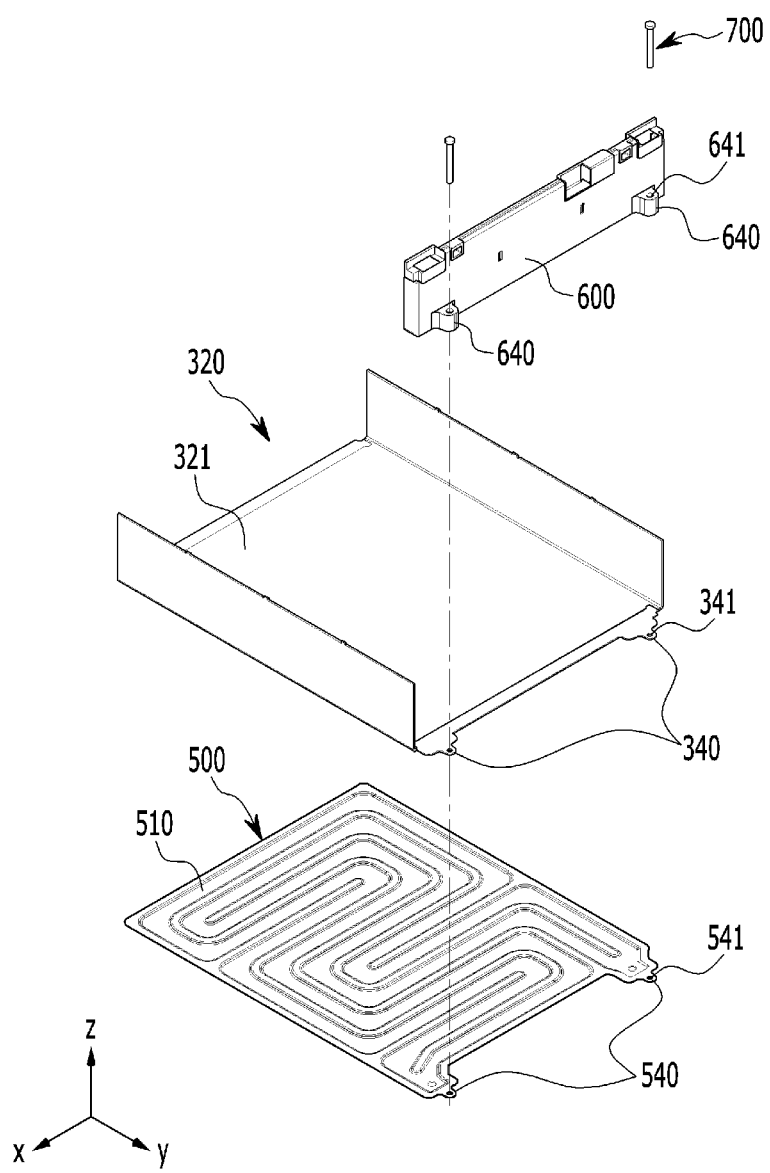
FIG. 6 is a perspective view of an end plate, a U-shaped frame, and a heat sink included in the battery module of FIG. 4.

FIG. 5 is a cross-sectional view along line B of FIG. 3, and FIG. 6 is a perspective view of an end plate, a U-shaped frame, and a heat sink included in the battery module of FIG. 4.

As illustrated in FIG. 3 to FIG. 6, the each of the pair of end plates 600 may include a first mounting portion 640 extending in a protruding direction (y-axis direction) of an electrode lead protruding from each of the plurality of battery cells 110 included in the battery cell stack 200. In other words, the first mounting portion 640 may protrude from the side surface opposite to one side surface on which the battery cell stack 200 is positioned based on the end plate 600.

The housing 300 may include a second mounting portion 340 extending along the first mounting portion 640 from the bottom portion 321. The heat sink 500 may include a third mounting portion 540 extending along the first mounting portion 640.

First to third through-holes 641, 341, and 541 may be formed in the first to third mounting portions 640, 340, and 540, respectively. In other words, the first through-hole 641 may be formed in the first mounting portion 640, the second through-hole 341 may be formed in the second mounting portion 340, and the third through-hole 541 may be formed in the third mounting portion 540. The first to third through holes 641, 341, and 541 may be formed to penetrate along a direction perpendicular to the bottom portion 321 (z-axis direction).

All of the first to third mounting portions 640, 340, and 540 may be configured to overlap each other, and accordingly, the first to third through-holes 641, 341, and 541 may be positioned to correspond to each other.

A fastening hole 1110 corresponding to first to third through-holes 641, 341, and 541 may be formed in the frame 1100, and a mounting bolt 700 may pass through the first to third through-holes 641, 341, and 541 to be coupled to the fastening hole 1110. The refrigerant supply pipe 1200 to be described later may be designed to pass by avoiding the mounting bolt 700 on the frame 1100.

The mounting bolt 700 includes a head portion 710 at an upper end thereof, and the head portion 710 preferably has a larger diameter than the first through-hole 641 for fixing.

The mounting and fixing of the end plate 600, the housing 300, and the heat sink 500 may be formed in a collective fastening method through the first to third mounting portions 640, 340, and 540 and the mounting bolt 700. That is, the above-mentioned components may be collectively fixed to the frame 1100.

Unlike performing the mounting and fixing for each component, since the fixing is performed by the collective fastening method as described above, the manufacturing process of the battery pack 1000 according to the present embodiment may be simplified, and the ease of assembly between respective components may be increased.

In addition, it is possible to reduce the cost and to increase the spatial utility of the battery pack because the collective fastening method is realized by reducing unnecessary fastening structures.

Hereinafter, an integrated cooling structure of the housing 300 and the heat sink 500 will be described in detail.

Figure 7:
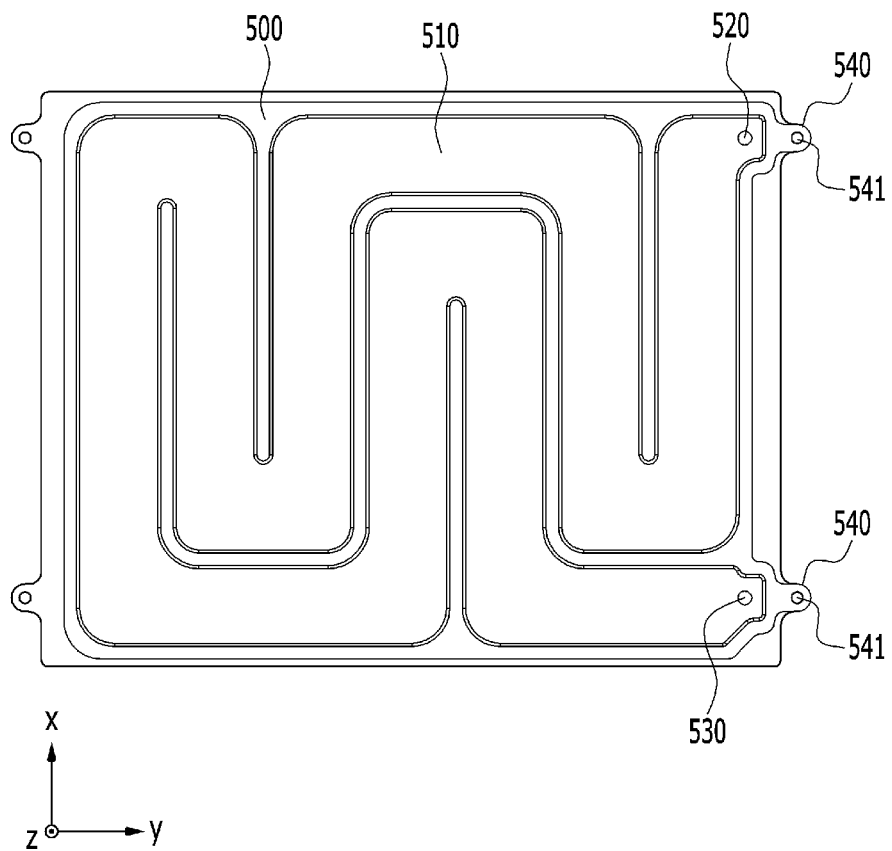
FIG. 7 is a plan view of the battery module of FIG. 4, as viewed from below.
Figure 8:
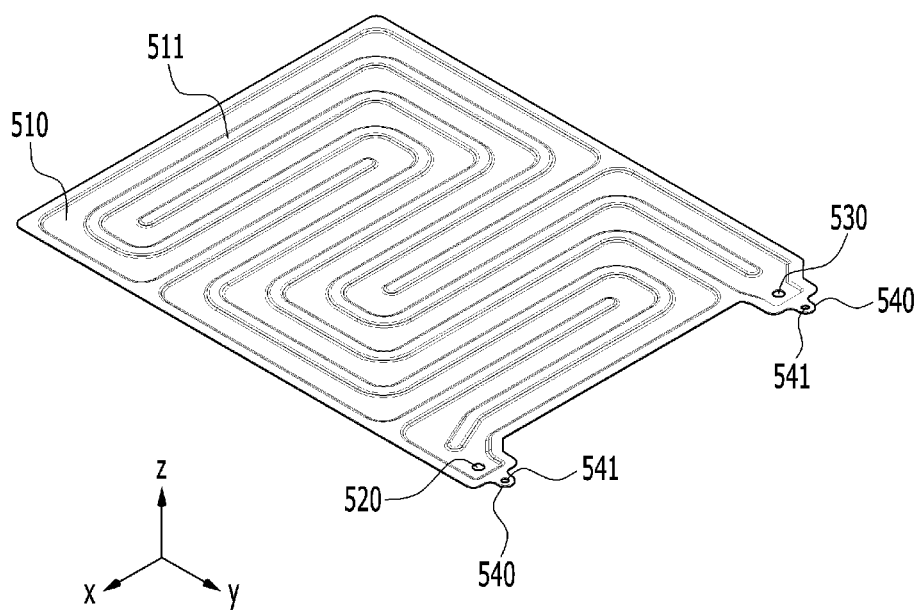
FIG. 8 is a perspective view of a heat sink included in the battery module of FIG. 4.

FIG. 7 is a plan view of the battery module of FIG. 4 viewed from below, and FIG. 8 is a perspective view of a heat sink included in the battery module of FIG. 4.

As illustrated in FIG. 4, FIG. 5, FIG. 7, and FIG. 8, the bottom portion 321 of the housing 300 forms an upper plate of the heat sink 500, and a supply pipe 510 of the heat sink 500 and the bottom portion 321 of the housing 300 may form a refrigerant flowing path.

Specifically, the supply pipe 510 of the heat sink 500 may be a U-shaped tube, and the bottom 321 may be positioned on an open upper side of the U-shaped tube. Here, the U-shaped tube means that a cross-section of the supplying tube 510 cut in an xz plane or a yz plane in FIG. 4 is U-shaped. That is, the open upper structure is expressed as the U-shaped tube. As the heat sink 500 comes into contact with the bottom portion 321, a space between the supply pipe 510 and the bottom portion 321 becomes a region in which a refrigerant flows, that is, a flow path of the refrigerant. Accordingly, the bottom portion 321 may come into direct contact with the refrigerant.

There is no particular limitation on the manufacturing method of the supply pipe 510 of the heat sink 500, but by providing a structure recessed with respect to the plate-shaped heat sink 500, a U-shaped supply pipe 510 with an open upper side may be formed.

Meanwhile, as shown in FIG. 5, a thermal resin layer 400 including a thermal resin may be positioned between the bottom portion 321 of the housing 300 and the battery cell stack 200. The thermal resin layer 400 may be formed by applying a thermal resin to the bottom portion 321 and curing the applied thermal resin.

The thermal resin may include a thermally conductive adhesive material, and specifically, may include at least one of a silicone material, a urethane material, and an acrylic material. The thermal resin may serve to fix one or more of the plurality of battery cells 110 to form the battery cell stack 200 by being liquid during application and cured after application. In addition, it has excellent thermal conductive characteristics, so that it may quickly transmit the heat generated in the one or more battery cells 110 to a lower side of the battery module.

Figure 2:
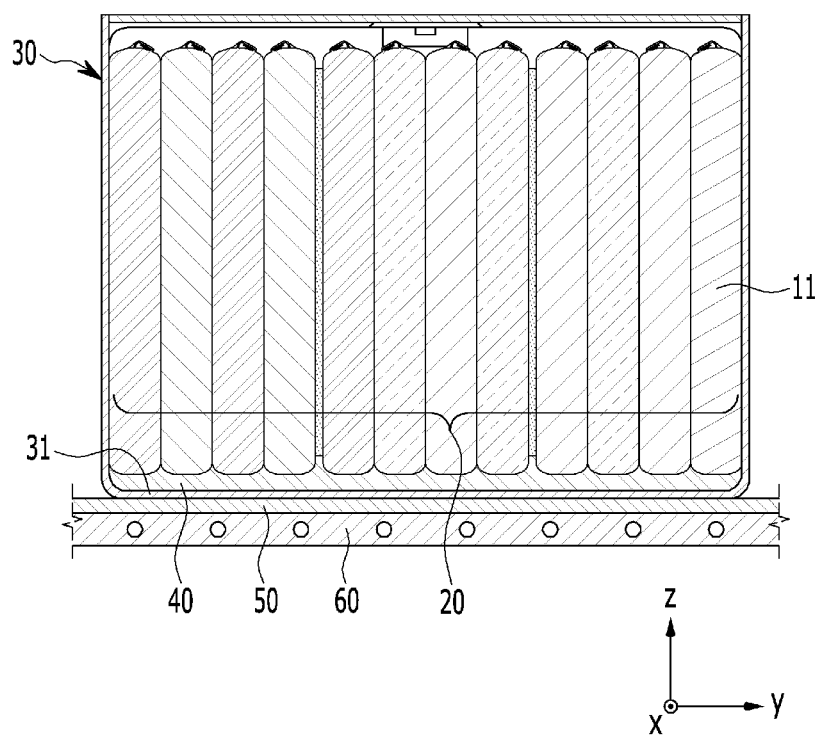
FIG. 2 is a cross-sectional view along line A-A' of FIG. 1.

In the conventional battery module 10 shown in FIG. 2, the heat generated in the plurality of battery cells 110 sequentially passes through the thermal resin layer 40, the bottom portion 31 of the housing 30, the heat transmitting member 50, and the refrigerant of the heat sink 60 to be transmitted to the outside of the battery module 10. In addition, the refrigerant flowing path of the heat sink 60 is positioned inside the heat sink 60.

On the other hand, the battery module 100 according to the present embodiment may implement a cooling integrated structure of the housing 300 and the heat sink 500 to further improve cooling performance. Specifically, the heat generated in the plurality of battery cells 110 may pass through the thermal resin layer 400, the bottom portion 321 of the housing 300, and the refrigerant to be transmitted to the outside of the battery module 100. By removing the conventional, unnecessary cooling structure, the heat transmitting path may be simplified and the air gap between respective layers may be reduced, so cooling efficiency or performance may be increased. Particularly, since the bottom portion 321 forms the upper plate of the heat sink 500, the bottom portion 321 is in direct contact with the refrigerant, and there is an advantage that more direct cooling is possible through the refrigerant. This may be compared with the related art as shown in FIG. 2 in which the heat transmitting member 50 and the upper configuration of the heat sink 60 are positioned between the bottom portion 31 and the refrigerant, which reduces cooling efficiency.

In addition, by removing the unnecessary cooling structure, a height of the battery module 100 is reduced, thereby reducing the cost and increasing the spatial utility of the battery pack 1000. Furthermore, since the battery module 100 may be compactly disposed, the capacity or output of the battery pack 1000 may be increased.

Meanwhile, the bottom portion 321 may be bonded to a portion of the heat sink 500 in which the supply pipe 510 is not formed through welding. The present embodiment, through the cooling integrated structure of the bottom portion 321 of the housing 300 and the heat sink 500, may improve the cooling performance as described above, may support the load of the battery cell stack 200 accommodated in the housing 300, and may reinforce the rigidity of the battery module 100.

For effective cooling, it is preferable that the supply pipe 510 is entirely formed in the bottom portion 321 of the housing 300 as shown in FIG. 7. To this end, the supply pipe 510 may be bent at least once to be connected from one side to the other side. Particularly, the supply pipe 510 is preferably bent several times to form the supply pipe 510 entirely in the bottom portion 321.

Meanwhile, the supply pipe 510 according to the present embodiment may include an inlet 520 for introducing a refrigerant and an outlet 530 for discharging the refrigerant. Specifically, when the supply pipe 510 is connected from one side to the other side, the inlet 520 may be provided at one lower end portion of the supply pipe 510, and the outlet 530 may be provided at the other lower end portion of the supply pipe 510.

The battery pack 1000 may include a refrigerant supply pipe 1200 positioned between the frame 1100 and the heat sink 500 to supply the refrigerant to the supply pipe 510.

An opening 1210 may be formed in the refrigerant supply pipe 1200, and the opening 1210 may be connected to the inlet 520. Specifically, the opening 1210 may be provided at a position corresponding to the inlet 520 while facing the supply pipe 510 to be connected to the inlet 520 in contact with each other. Although not specifically shown, in the same way, an opening connected to the outlet 530 may be formed in a pack refrigerant discharging pipe (not shown).

Accordingly, the refrigerant moving along the refrigerant supply pipe 1200 may be introduced into the supply pipe 510 of the heat sink 500 through the inlet 520. The refrigerant moving along the supply pipe 510 may be recovered from the pack refrigerant discharging pipe (not shown) through the outlet 530.

Meanwhile, at least one of the inlet 520 and the outlet 530 may include a sealing member 521 surrounding an outer circumference thereof. The sealing member 521 surrounding the inlet 520 may be positioned between the supply pipe 510 and the refrigerant supply pipe 1200, and the sealing member surrounding the outlet 530 may be positioned between the supply pipe 510 and the pack refrigerant discharging pipe (not shown). When the refrigerant is introduced and discharged, it is possible to prevent the refrigerant from being leaked because of the sealing member 521. Although there is no limitation on the structure of the sealing member 521 according to the present embodiment, a gasket-shaped member as shown or a valve port member may be applied.

In addition, as shown in FIG. 5, since the end plate 600, the housing 300, the heat sink 500, and the pack refrigerant supply pipe 1200 are strongly in direct contact with each other by the fastening force of the mounting bolt 700 according to the collective fastening method, possibility of refrigerant leakage therebetween may be reduced.

Meanwhile, the refrigerant is a medium for cooling, and there is no particular limitation, but may be a coolant.

Meanwhile, a partition wall 511 may be formed in the supply pipe 510. The partition wall 511 may protrude in an upward direction to form a structure extending along the supply pipe 510. By increasing a width of the supply pipe 510 and forming the partition wall 511 at a center thereof and by decreasing a width of the refrigerant flowing path, it is possible to minimize a pressure drop of the refrigerant and to reduce a temperature deviation of the refrigerant.

In the present embodiment, although the terms indicating the directions such as forward, backward, left, right, up, and down have been used, these terms are only for convenience of description, and may be changed depending on the position of target objects or observers.

One or more battery modules according to the present embodiment described above may be mounted together with various control and protection systems, such as a battery management system (BMS) and a cooling system, to form a battery pack.

The battery module or the battery pack may be applied to various devices. Specifically, it may be applied to a transportation apparatus such as an electric bicycle, an electric vehicle, a hybrid vehicle, and the like, but is not limited thereto, and may be applied to various devices that can use the secondary battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A battery pack comprising:
a battery cell stack comprising a plurality of battery cells;
a housing accommodating the battery cell stack;
a pair of end plates that cover a front surface and a rear surface of the battery cell stack, wherein the pair of end plates are coupled to the housing;
a heat sink below a bottom portion of the housing;
a frame under the heat sink and coupled to the housing; and
an electrode lead protruding from each of the plurality of battery cells,
a first mounting portion extending from each of the pair of end plates in a protruding direction of the electrode lead,
a second mounting portion extending from the bottom portion of the housing in a direction of the first mounting portion from the bottom portion,
a third mounting portion extending from the heat sink in a direction of the first mounting portion, and
first to third through-holes formed in the first to third mounting portions, respectively, wherein the first to third through-holes are positioned to correspond to each other,
wherein the bottom portion of the housing forms an upper plate of the heat sink,
wherein mounting and fixing structures of the pair of end plates, the housing, and the heat sink are formed in a collective fastening method,
wherein the mounting and fixing structures are coupled to the frame, and
wherein the first to third through-holes are positioned to correspond to each other.

2. The battery pack of claim 1, further comprising:
a mounting bolt, and
a fastening hole in the frame,
wherein the mounting bolt penetrates the first to third through-holes to be coupled to the fastening hole.

3. The battery pack of claim 2, wherein:
the mounting bolt includes a head portion at an upper end thereof, and
the head portion has a larger diameter than the first through-hole.

4. The battery pack of claim 1, wherein:
the heat sink includes a supply pipe, and
the supply pipe and the bottom portion form a refrigerant flowing path.

5. The battery pack of claim 4, wherein:
the bottom portion is in direct contact with the refrigerant.

6. The battery pack of claim 4, wherein:
the supply pipe is a U-shaped pipe, and the bottom portion is positioned at an open upper side of the U-shaped pipe.

7. The battery pack of claim 4, wherein:
the supply pipe includes an inlet for introducing the refrigerant and an outlet for discharging the refrigerant.

8. The battery pack of claim 7, further comprising:
a frame under the heat sink, wherein the frame is coupled to the housing, and
a pack refrigerant supply pipe between the frame and the heat sink, wherein the pack refrigerant supply pipe supplies the refrigerant to the supply pipe.

9. The battery pack of claim 8, wherein:
an opening formed in the pack refrigerant supply pipe is connected to the inlet.

10. The battery pack of claim 8, wherein:
at least one of the inlet and the outlet includes a sealing member surrounding an outer circumference thereof.

11. The battery pack of claim 1, further comprising:
a thermal resin layer between the bottom portion of the housing and the battery cell stack.

12. A device comprising the battery pack according to claim 1.

13. The battery pack of claim 10, wherein:
the sealing member surrounds the inlet, and
the sealing member is positioned between the supply pipe and the pack refrigerant supply pipe.

* * * * *